(12) United States Patent
Hosoya et al.

(10) Patent No.: US 10,344,693 B2
(45) Date of Patent: Jul. 9, 2019

(54) CONTROL APPARATUS FOR GASOLINE ENGINE

(71) Applicant: Toyota Jidosha Kabushiki Kaisha, Toyota-shi Aichi-ken (JP)

(72) Inventors: Takanobu Hosoya, Gotenba (JP); Norihisa Nakagawa, Susono (JP); Koichi Kimura, Numazu (JP); Takuya Okubo, Fuji (JP)

(73) Assignee: Toyota Jidosha Kabushiki Kaisha, Toyota-shi (JP)

(*) Notice: Subject to any disclaimer, the term of this patent is extended or adjusted under 35 U.S.C. 154(b) by 346 days.

(21) Appl. No.: 15/426,637

(22) Filed: Feb. 7, 2017

(65) Prior Publication Data
US 2017/0241359 A1 Aug. 24, 2017

(30) Foreign Application Priority Data
Feb. 18, 2016 (JP) ................... 2016-028896

(51) Int. Cl.
*F02D 41/02* (2006.01)
*B01D 53/94* (2006.01)
(Continued)

(52) U.S. Cl.
CPC ..... *F02D 41/0255* (2013.01); *B01D 53/9445* (2013.01); *B01D 53/9495* (2013.01);
(Continued)

(58) Field of Classification Search
CPC .. F02D 41/0255; F02D 41/402; F02D 41/405; F02D 2041/389; F02D 2200/1002; B01D 53/9445; B01D 53/9495; F01N 3/101; F02P 5/15; F02P 5/1506; Y02T 10/26; Y02T 10/44; Y02T 10/46
(Continued)

(56) References Cited

U.S. PATENT DOCUMENTS

| 5,207,058 A | 5/1993 | Sasaki et al. |
| 5,642,705 A | 7/1997 | Morikawa et al. |

(Continued)

FOREIGN PATENT DOCUMENTS

| EP | 1245816 A2 | 10/2002 |
| JP | H04183922 A | 6/1992 |

(Continued)

*Primary Examiner* — Audrey K Bradley
*Assistant Examiner* — Kelsey L Stanek
(74) *Attorney, Agent, or Firm* — Dinsmore & Shohl LLP (57) ABSTRACT

A control apparatus for a gasoline engine having a fuel injection means including an in-cylinder injection valve. The control apparatus comprises a controller configured to, when warming up an exhaust gas purification catalyst provided in an exhaust passage provided of the gasoline engine, control the fuel injection means to conduct one or more main injections, control the in-cylinder injection valve to conduct a post injection, perform a retard correction of an ignition timing at which fuel injected by the one or more main injections is ignited, determine an injection quantity by the one or more main injections and an injection quantity by the post injection such that an air-fuel mixture formed in the cylinder by gasoline fuel injected by the one or more main injections has a predetermined lean air-fuel ratio at which a difference between an actual output torque and a required torque is within a predetermined allowable range.

2 Claims, 6 Drawing Sheets

(51) Int. Cl.
*F01N 3/10* (2006.01)
*F02D 41/40* (2006.01)
*F02P 5/15* (2006.01)
F02D 41/38 (2006.01)

(52) U.S. Cl.
CPC ........... *F01N 3/101* (2013.01); *F02D 41/402* (2013.01); *F02D 41/405* (2013.01); *F02P 5/15* (2013.01); *F02D 2041/389* (2013.01); *F02D 2200/1002* (2013.01); *F02P 5/1506* (2013.01); *Y02T 10/26* (2013.01); *Y02T 10/44* (2013.01); *Y02T 10/46* (2013.01)

(58) Field of Classification Search
USPC .......................................................... 60/284
See application file for complete search history.

(56) References Cited

U.S. PATENT DOCUMENTS

| | | |
|---|---|---|
| 5,975,046 A | 11/1999 | Kaneko et al. |
| 6,330,796 B1 | 12/2001 | Nishimura et al. |

FOREIGN PATENT DOCUMENTS

| | | |
|---|---|---|
| JP | H08100638 A | 4/1996 |
| JP | H10122015 A | 5/1998 |
| JP | H11082090 A | 3/1999 |
| JP | 2000-045844 A | 2/2000 |
| JP | 2002-357145 A | 12/2002 |

CONTROL APPARATUS FOR GASOLINE ENGINE

CROSS-REFERENCE TO RELATED APPLICATIONS

The present application claims priority under 35 U.S.C. § 119 to Japanese Patent Application No. 2016-028896, filed Feb. 18, 2016, which is incorporated by reference herein in its entirety.

BACKGROUND

Field

The present disclosure relates to a control apparatus for a gasoline engine.

Description of the Related Art

Gasoline engines that burn fuel by spark ignition widely employ a technique for warming up an exhaust gas purification catalyst provided in an exhaust passage by burning fuel injected for warming-up in addition to fuel for generating a required torque to thereby supply high temperature exhaust gas to the exhaust gas purification catalyst. For example, in a technique disclosed in Patent Literature 1, after the main combustion carried out by the first normal fuel injection and ignition, the secondary additional fuel injection is performed at an early or middle stage of the expansion stroke, so that the additionally supplied fuel is ignited by propagation of the flame of the main combustion without need to perform the ignition again. In this case, the exhaust gas discharged from the gasoline engine contains a relatively large quantity of fuel components, and the fuel components are oxidized and burned by after burning while they travel to the exhaust gas purification catalyst, leading to a rise in the temperature of the exhaust gas flowing into the exhaust gas purification catalyst.

CITATION LIST

Patent Literature

PTL 1: Japanese Patent Application Laid-Open No. H8-100638

SUMMARY

Prior art gasoline engines are configured to burn additional gasoline fuel to warm up an exhaust gas purification catalyst so that the exhaust gas will contain a relatively large quantity of unburned hydrocarbon (HC). The unburned HC is oxidized in the exhaust passage, leading to a rise in the temperature of the exhaust gas flowing into the exhaust gas purification catalyst. However, if the fuel components are not oxidized or burned sufficiently while they travel to the exhaust gas purification catalyst, the temperature of the exhaust gas flowing into the exhaust gas purification catalyst cannot be raised sufficiently, and the exhaust gas purification catalyst cannot be warmed up. Moreover, the unburned HC flows into the exhaust gas purification catalyst that is not warmed up sufficiently, possibly leading to an increase in harmful emissions in the region downstream of the catalyst.

To warm up an exhaust gas purification catalyst, it may be desirable to raise the temperature of the catalyst quickly. However, during the warming-up process, it is difficult for the exhaust gas purification catalyst to exercise adequate purifying capability, and therefore it is undesirable that a large quantity of unburned gasoline fuel components and substances to be removed such as NOx be contained in the exhaust gas flowing into the exhaust gas purification catalyst, which is the case with prior art systems. It is also undesirable that a reduction of the quantity of the exhaust gas flowing into the exhaust gas purification catalyst leads to a deficiency in the power output of the gasoline engine. In order to prevent an increase in harmful emissions during the warming-up of the exhaust gas purification catalyst or a decrease in engine power output, it may be desirable to raise the temperature of the exhaust gas flowing into the exhaust gas purification catalyst and to establish an appropriate combustion state in the gasoline engine in a well-balanced manner. Prior art techniques have not been developed satisfactorily from this point of view.

Embodiments of the present disclosure provide a technique that may enable quick warming-up of an exhaust gas purification catalyst and establishment of an appropriate combustion state during the warming-up in a gasoline engine.

Solution to Problem

Embodiments of the present disclosure include techniques of injecting a quantity of gasoline fuel according to a required torque of the gasoline engine by one or more main injections and a post injection while controlling the post injection timing so that the post injection is performed when the gasoline fuel injected by the main injection is burning. Thus, by injecting a portion of the quantity of gasoline fuel according to the required torque by the post injection, an air-fuel mixture formed by the gasoline fuel injected by the one or more main injections is made lean to reduce its combustion temperature, thereby reducing the production of NOx. Moreover, the gasoline fuel injected by the post injection can be burned in a manner that enables a reduction of unburned components. Therefore, it is possible to reduce the quantity of substances to be removed flowing into the exhaust gas purification catalyst while keeping the exhaust gas temperature during the warming-up process relative high.

More specifically, a control apparatus for a gasoline engine, the gasoline engine having a fuel injection means including at least an in-cylinder injection valve for injecting gasoline fuel directly into a cylinder, and an exhaust passage provided with an exhaust gas purification catalyst for purifying exhaust gas discharged from the gasoline engine, according to embodiments of the present disclosure comprises: a controller, comprising at least one processor, configured to, when warming up the exhaust gas purification catalyst, execute a catalyst warming-up process of controlling the fuel injection means to conduct one or more main injections of gasoline fuel, controlling the in-cylinder injection valve to conduct a post injection of gasoline fuel, and performing a retard correction of an ignition timing by an ignition plug at which fuel injected by the one or more main injections is ignited. The controller may be further configured to, when executing the catalyst warming-up process: control the in-cylinder injection valve to conduct the post injection during a specific period, in an expansion stroke until a valve opening time at which an exhaust valve of the gasoline engine is opened, during which pressure in the cylinder increases due to combustion of the gasoline fuel injected by the one or more main injections and ignited by the ignition plug; and determine a quantity of gasoline fuel to be injected by the one or more main injections and a quantity of gasoline fuel to be injected by the post injection such that a total quantity of gasoline fuel to be injected by the one or more main injections and the post injection is a value according to a required torque of the gasoline engine and such that an air-fuel mixture formed in the cylinder by the gasoline fuel injected by the one or more main injections has a predetermined lean air-fuel ratio at which a difference between an actual output torque and the required torque is within a predetermined allowable range.

The gasoline engine according to embodiments of the present disclosure has the fuel injection means including at least an in-cylinder injection valve for injecting gasoline fuel directly into a cylinder. In other words, the fuel injection means of the gasoline engine may include another injection valve (e.g. a port injection valve that injects fuel in the intake port) in addition to the in-cylinder valve or may have only the in-cylinder valve. As described above, among the two types of injections (the main and post injections) performed by the fuel injection means, the post injection is to be performed by the in-cylinder valve.

In the gasoline engine according to embodiments of the present disclosure, the warming-up process is executed to warm up the exhaust gas purification catalyst. The warming-up process may be executed when it is necessary to warm up the exhaust gas purification catalyst, namely when the temperature of the catalyst is low. During the warming-up process, the ignition timing by the ignition plug is retarded by the retard correction as compared to the time during which the warming-up process is not being executed. Consequently, the combustion timing of the gasoline fuel injected by the one or more main injections is delayed, so that the exhaust gas temperature is raised for warming up of the exhaust gas purification catalyst. During this process, the pressure in the cylinder increases in a relatively late period in the expansion stroke (e.g. at a middle or late stage of the expansion stroke) after ignition by the ignition plug due to the combustion of the gasoline fuel injected by the one or more main injection.

Among the two types of injections (one or more main injections and post injections) performed by the fuel injection means, each main injection may be performed by either the in-cylinder injection valve or other means (e.g. a port injection valve), so long as it is performed by the fuel injection means. The gasoline fuel injected by one or more main injections is burned by ignition by the ignition plug that is retarded by the retard correction to contribute to the increase in the in-cylinder pressure in the expansion stroke. The controller controls the in-cylinder injection valve to conduct the post injection during a specific period during which the in-cylinder pressure increases. Note that the specific period is also a period which is in an expansion stroke until a valve opening time at which an exhaust valve of the gasoline engine is opened.

As above, the specific period is a period in the expansion stroke during which the in-cylinder pressure is increasing due to combustion of the gasoline fuel injected by the one or more main injections. Therefore, during this specific period, explosive combustion of the gasoline fuel injected by the one or more main injections is occurring in the cylinder, so that the gasoline fuel injected by the post injection is immediately exposed to the combustion of the gasoline fuel injected by the one or more main injections to burn. Thus, its combustion energy produces, together with the combustion energy of the gasoline fuel injected by the one or more main injections, the output torque of the gasoline engine. Since the in-cylinder pressure is increased at the time when the gasoline fuel is injected by the post injection, the gasoline fuel injected by the post injection is unlikely to hamper the combustion of the gasoline fuel injected by the one or more main injections. In consequence, the gasoline fuel injected by the main and post injections is burned in a manner that prevents a circumstance in which exhaust gas discharged from the gasoline engine contains a large quantity of unburned HC from occurring, thereby preventing an increase in harmful emissions during the catalyst warming-up process.

As a quantity of gasoline fuel according to the required torque of the gasoline engine is injected in a divided manner by the one or more main injections and the post injection, the quantity of gasoline fuel injected by the one or more main injections can be decreased and the air-fuel ratio of the resultant air-fuel mixture can be made leaner consequently. Thus, as the quantity of gasoline fuel injected by the post injection is increased, the quantity of gasoline fuel injected by the one or more main injections decreases accordingly, and the air-fuel ratio of the air-fuel mixture formed by the one or more main injections is made leaner. Hence, the combustion temperature decreases, enabling reduction of the quantity of NOx. The air-fuel ratio of the air fuel mixture formed by the one or more main injections depends on the ratio of the quantity of gasoline fuel injected by the one or more main injections to the intake air quantity taken into the cylinder.

As the air-fuel ratio of the air-fuel mixture formed by the one or more main injections becomes leaner, the combustion energy produced by the combustion of the gasoline fuel injected by the one or more main injection decreases, and the quantity of gasoline fuel injected by the post injection, which will burn using this combustion energy, increases. Therefore, if the air-fuel ratio of the air-fuel mixture formed by the one or more main injections is too high, the combustion of the injected fuel is prevented from efficiently contributing to the output torque of the gasoline engine, making the difference between the actual output torque of the gasoline engine and the required torque. Therefore, taking the aforementioned output torque difference into consideration, the quantity of gasoline fuel injected by the one or more main injections and the quantity of gasoline fuel injected by the post injection are determined such that the air-fuel mixture formed in the cylinder by the gasoline fuel injected by the one or more main injections has a predetermined lean air-fuel ratio that is determined such that the aforementioned output torque difference is within a predetermined allowable range at this predetermined lean air-fuel ratio.

As above, when executing the warming-up process for raising the temperature of the exhaust gas by retarding the ignition time by correction, the control apparatus for the gasoline engine according to embodiments of the present disclosure sets the injection timing into the cylinder by the post injection in the specific period and determines the injection quantities in the one or more main injections and the post injection respectively, whereby an increase in harmful emissions and a decrease in the output torque can be prevented while establishing a suitable condition in terms of the temperature and air-fuel ratio of the exhaust gas supplied to the exhaust gas purification catalyst for warming-up of the catalyst. Therefore, the exhaust gas purification catalyst can be warmed up quickly, and an appropriate combustion state can be established during the warming-up process in the gasoline engine.

The controller may be further configured to, when executing the catalyst warming-up process: calculate a total injection quantity of gasoline fuel to be injected by the one or more main injections and the post injection based on the required torque; calculate a temporary main injection quantity defined as a quantity of gasoline fuel capable of achieving the predetermined lean air-fuel ratio; calculate a temporary main injection quantity of gasoline fuel by subtracting the temporary main injection quantity from the total injection quantity; determine whether or not it is possible to inject the temporary post injection quantity of gasoline fuel within the specific period; when determining that it is possible to inject the temporary post injection quantity of gasoline fuel within the specific period, determine the temporary main injection quantity as the quantity of gasoline fuel to be injected by the one or more main injections and determine the temporary post injection quantity as the quantity of gasoline fuel to be injected by the post injection; and when determining that it is not possible to inject the temporary post injection quantity of gasoline fuel within the specific period, determine a maximum post injection quantity, which is the largest quantity of gasoline fuel that can be injected within the specific period by the in-cylinder injection valve, determine a sum of the temporary main injection quantity and an excess of the temporary post injection quantity over the maximum post injection as the quantity of gasoline fuel to be injected by the one or more main injections.

The above-described control apparatus for a gasoline engine according to embodiments of the present disclosure performs the post injection in the specific period as described above. Specifically, the post injection is to be performed during the limited period in the compression stroke during which the in-cylinder pressure increases due to the combustion of the gasoline fuel injected by the one or more main injections until the exhaust valve is opened. Therefore, the quantity of gasoline fuel that can be injected by the post injection is limited in conjunction with a requirement other than the formation of an air-fuel mixture having the predetermined lean air-fuel ratio by the one or more main injections. Therefore, the controller is configured to calculate a temporary main injection quantity and a temporary post injection quantity, which are temporary values of the injection quantities in the main injection and the post injection, on the basis of the predetermined lean air-fuel ratio. Moreover, the controller is configured to determine or assess whether or not it is possible to inject the calculated temporary post injection quantity of gasoline fuel within the specific period by the in-cylinder injection valve. For example, the determination unit may make this determination with reference to the length of time needed for the injection and the duration of the specific period.

In the case where it is determined that the injection is possible, the controller sets (determines) the temporary injection quantities in the calculated injections as the final injection quantities to be achieved. On the other hand, in the case where it is determined that the injection is not possible, the controller sets the maximum post injection quantity defined as the largest quantity of gasoline fuel that can be injected by the post injection within the specific period as the final gasoline injection quantity in the post injection, and sets the temporary main injection quantity plus the excess of the temporary post injection quantity over the maximum post injection quantity as the final gasoline injection quantity in the one or more main injections so as to allot the excess of the temporary post injection quantity over the maximum post injection quantity to the one or more main injections. By determining the injection quantities in the one or more main injections and the post injection in this way, the quantity of gasoline fuel injected by the post injection may be made as large as possible. Therefore, the exhaust gas purification catalyst can be warmed up quickly, and a desirable combustion state can be established in the warming-up process in the gasoline engine.

Embodiments of the present disclosure may provide a technique that enables quick warming-up of an exhaust gas purification catalyst and establishment of an appropriate combustion state during the warming-up.

DETAILED DESCRIPTION

In the following, examples of embodiments of the present disclosure will be described with reference to the drawings. The dimensions, materials, shapes, relative arrangements, and other features of the components that will be described in connection with the embodiment are not intended to limit the technical scope of the present disclosure only to them, unless particularly stated.

Figure 1:
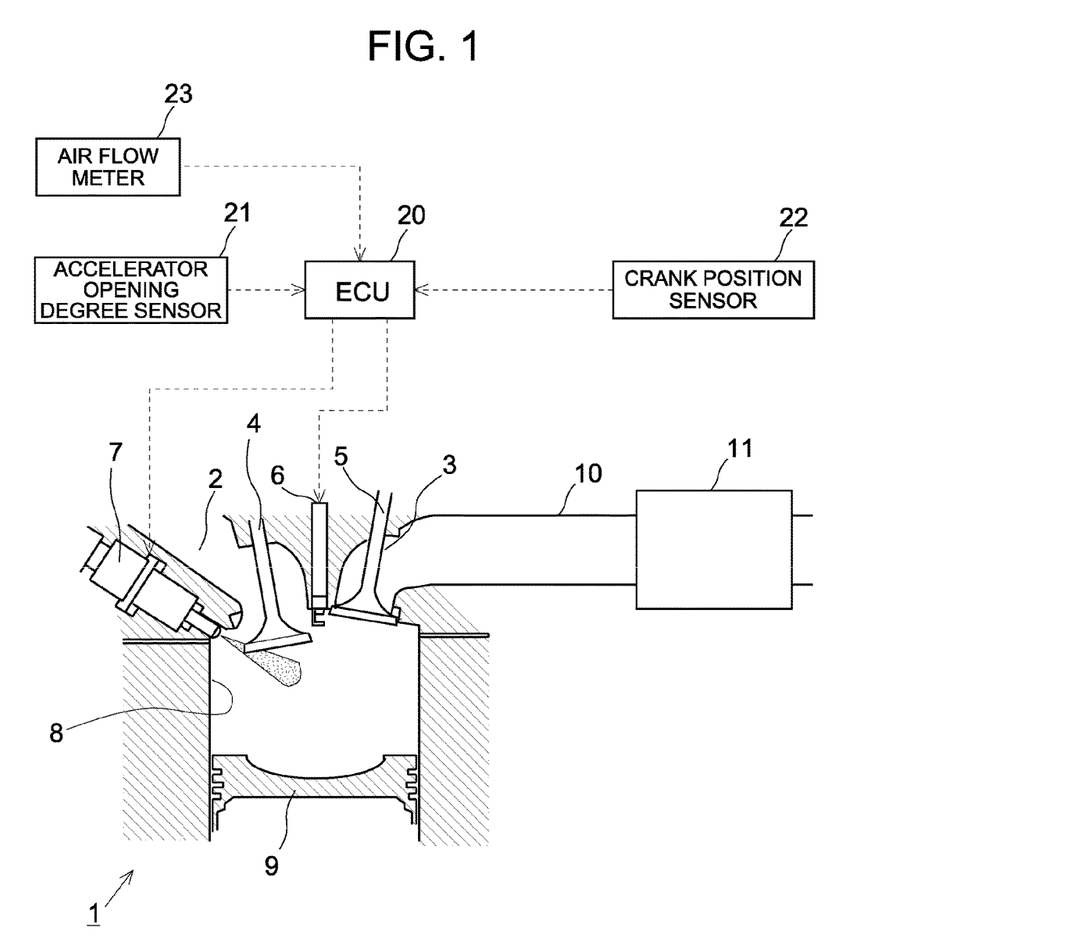
FIG. 1 is a diagram showing the general configuration of a gasoline engine to which a control apparatus according to an embodiment of the present disclosure is applied.

FIG. 1 is a diagram showing the general configuration of a gasoline engine 1 to which a control apparatus according to an embodiment of the present disclosure is applied. The gasoline engine 1 is a direct-injection spark-ignition internal combustion engine for driving a vehicle. The gasoline engine 1 has a cylinder 8 to which an intake port 2 and an exhaust port 3 are connected. The intake port 2 allows intake air to flow into the cylinder 8 with opening and closing of an intake valve 4, and the exhaust port 3 allows the exhaust gas such as burned gas to exit to an exhaust passage 10 with opening and closing of an exhaust valve 5. In the exhaust passage 10, there is provided a three-way catalyst 11, which is a catalyst for exhaust gas purification. In the cylinder 8, there are provided a piston 9 and an ignition plug 6, which is arranged at the top of the cylinder 8 opposed to the piston 9 in such a way as to be capable of igniting the air-fuel mixture in the cylinder 8.

The gasoline engine 1 has a fuel injection valve 7 arranged on the side of the intake port 2. The direction of injection through the fuel injection valve 7 is oriented generally obliquely downward in the cylinder 8. The fuel injection valve 7 is a solenoid fuel injection valve having a channel formed in its body through which fuel can flow. Fuel is supplied to this channel through a delivery pipe (not shown). The fuel injection valve 7 is designed and arranged in such a way as to be capable of injecting the gasoline fuel thus supplied directly into the cylinder 8 with an operation of a needle valve provided in the fuel injection valve 7.

The gasoline engine 1 is provided with an ECU 20, which is an electronic control unit that performs various controls of the gasoline engine 1. The gasoline engine 1 has an accelerator opening degree sensor 21 electrically connected with the ECU 20. The ECU 20 receives a signal representing the accelerator opening degree and calculates the values of the torque that the gasoline engine 1 is required to provide etc. on the basis of the received signal. The ECU 20 is also electrically connected with a crank position sensor 22. The ECU 20 receives a signal representing the rotational angle of the output shaft of the gasoline engine 1 and calculates the engine speed of the gasoline engine 1 etc. Moreover, the ECU 20 is electrically connected with an air flow meter 23 provided in an intake passage (not shown) connected to the intake port 2. Thus, the ECU 20 can determine the flow rate of the intake air flowing in the intake passage. The ECU 20 is also electrically connected with various sensors provided in the gasoline engine 1 in addition to those mentioned above and controls the quantity and timing of fuel injection through the fuel injection valve 7. The ECU 20 also performs other various controls of the gasoline engine 1.

The three-way catalyst may not exercise its exhaust gas purification capability effectively unless the catalyst temperature of the three-way catalyst 11 does not rise to a sufficiently active temperature. In particular, during the cold start of the gasoline engine 1, the catalyst temperature of the three-way catalyst 11 is generally at room temperature. Therefore, in order to keep emissions downstream of the catalyst at a satisfactory level, it may be necessary to raise the catalyst temperature of the three-way catalyst 11 quickly. To this end, the ECU 20 performs a catalyst warming-up process in the gasoline engine 1. In the following, the catalyst warming-up process will be described with reference to FIG. 2.

Figure 2:
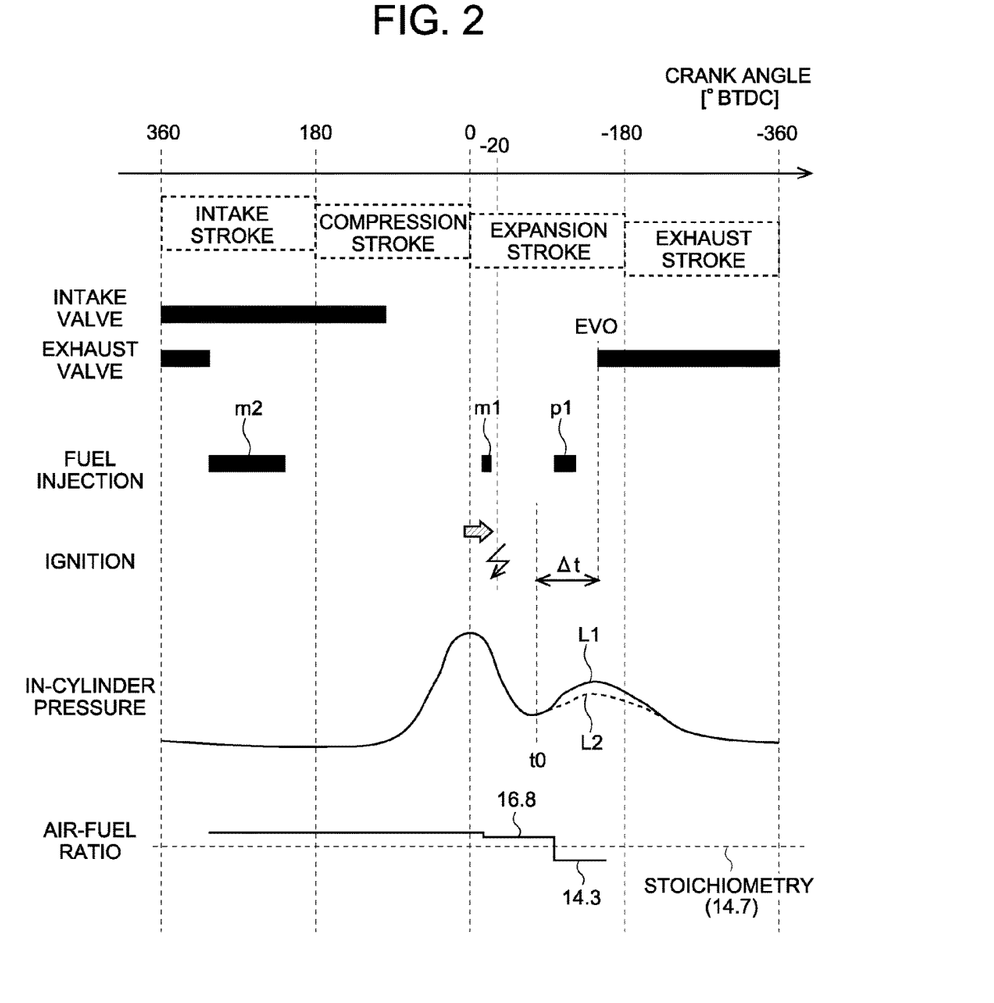
FIG. 2 is a diagram showing the changes in the open/close status of intake and exhaust valves, the fuel injection status, the timing of ignition, and the in-cylinder pressure in one combustion cycle when a catalyst warming-up process is performed by the control apparatus according to the embodiment.

FIG. 2 shows the change in the open/close status of the intake and exhaust valves 4, 5, the change in the fuel injection status of the fuel injection valve 7, the timing of ignition by the ignition plug 6, the change in the in-cylinder pressure of the cylinder 8, and the change in the air-fuel ratio of the air-fuel mixture in the cylinder 8 in one combustion cycle. It should be noted that the air-fuel ratio of the air-fuel mixture in the cylinder changes depending on the intake air quantity and the quantity of gasoline fuel in the cylinder, strictly speaking. However in FIG. 2, for the sake of simplicity of illustration, the air-fuel ratio is shown as a constant average air-fuel ratio in each of the period from the start of the second main injection m2 (described later) to the start of the first main injection m1 (described later), the period from the start of the first main injection m1 to the start of post injection p1 (described later), and the period from the start of the post injection p1 to the time EVO that will be described later. The catalyst warming-up process raises the temperature of the exhaust gas flowing into the three-way catalyst 11 and changes the air-fuel ratio of the exhaust gas flowing into the three-way catalyst 11 to a slightly rich air-fuel ratio (e.g. approximately 14.3), thereby activating the exhaust gas purifying capability of the three-way catalyst 11 (namely, the capability of removing unburned HC of fuel by oxidation and removing NOx by reduction).

Specifically, as shown in FIG. 2, in the catalyst warming-up process, divided injection is performed, in which the timing of fuel injection through the fuel injection valve 7 in one combustion cycle is divided into two main injections performed during the intake stroke and at an early stage of the expansion stroke respectively and a post injection performed at a middle or late stage of the expansion stroke. The main injections mentioned above are injections of gasoline fuel to be burned by ignition by the ignition plug 6, which are performed by the fuel injection valve 7. In this specification, the main injection that is performed at a time near the time of ignition by the ignition plug 6 is referred to as the first main injection m1, and the main injection that is performed during the intake stroke at a time earlier than the first main injection m1 is referred to as the second main injection m2. The first main injection m1 and the second main injection m2 are collectively referred to as the main injections, in some cases. Therefore, in cases where each main injection is not specified individually, the expression "the gasoline fuel of the main injections" shall mean both the gasoline fuel injected by the first main injection m1 and the gasoline fuel injected by the second main injection m2. Among the main injections, the first main injection m1 is performed to facilitate ignition of the gasoline fuel injected by the main injection. The gasoline fuel injected by the post injection performed after the main injection is not directly ignited by the ignition by the ignition plug 6. Details of the divided injection will be described later.

During the catalyst warming-up process, the timing of ignition by the ignition plug 6 is retarded by correction from the timing during the period in which the catalyst warming-up process is not being performed, namely during the period in which the three-way catalyst 11 has been warmed up already and is in an active state. For example, when the three-way catalyst 11 is in an active state, the time of ignition is set to a time immediately before the compression top dead center (0° BTDC in FIG. 2), and during the catalyst warming-up process, the time of ignition is retarded by correction to a time near 20° BTDC as shown in FIG. 2. This retard of the ignition time by correction delays the time of combustion of the gasoline fuel injected by the post injection, making the temperature of the exhaust gas discharged from the cylinder 8 to the exhaust port 3 higher.

Curve L1 in FIG. 2 represents the change in the in-cylinder pressure in the cylinder 8 resulting from the fuel injection and ignition performed in the above-described manner. When the three-way catalyst 11 has already been in an active state, the time of ignition by the ignition plug 6 is not retarded by correction but set to a time near the compression top dead center. Therefore, the rise in the in-cylinder pressure resulting from the ignition occurs in an early stage of the expansion stroke. On the other hand, in the catalyst warming-up process, since the time of ignition by the ignition plug 6 is retarded by correction, the time t0 at which the in-cylinder pressure starts to rise due to flame generated by the ignition and propagating in the cylinder is retarded to a middle or later stage of the expansion stroke. In other words, the rise in the in-cylinder pressure occurring after the time t0 in the expansion stroke suggests that combustion of the gasoline engine injected by the main injection has progressed to an extent that affects the output torque of the gasoline engine 1.

Figure 3:
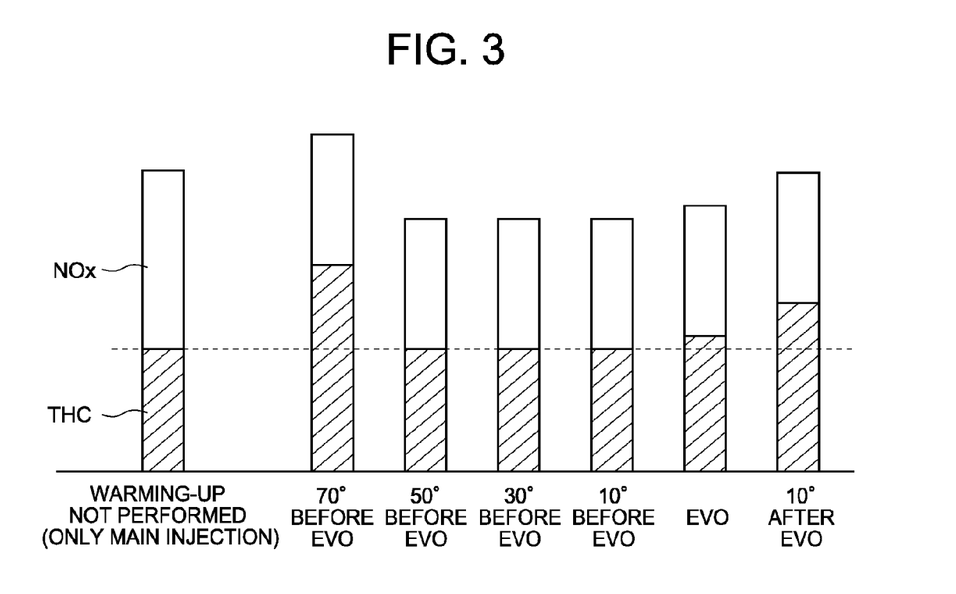
FIG. 3 is a diagram illustrating how the quantity of emissions changes with variations in the time to perform the post injection in the catalyst warming-up process performed by the control apparatus according to the embodiment.

Here, when the post injection is to be performed will be described with reference to FIG. 3. FIG. 3 shows how the quantity of unburned HC of gasoline fuel (THC) and the quantity of NOx (NOx) contained in the exhaust gas change with variations in the time of post injection relative to the time EVO at which the exhaust valve 5 is opened in a case where appropriate quantities of gasoline fuel are injected by the main injections and the post injection respectively for the above-described catalyst warming-up process. How to determine the quantity of gasoline fuel injected by the main injections and the quantity of gasoline fuel injected by the post injection will be described later. The leftmost bar in FIG. 3 shows, for reference, the quantity of unburned HC and the quantity of NOx contained in the exhaust gas in a case where the above-described catalyst warming-up process is not performed, namely in a case where a quantity of gasoline fuel equal the total quantity of gasoline fuel injected in the catalyst warming-up process is injected by the main injection. The time indicated as "50° before EVO" corresponds to the time t0 in FIG. 2.

The period from the time t0 to the time EVO will be referred to as a specific period Δt. During the specific period Δt, an air-fuel mixture by the gasoline fuel injected by the main injections m1, m2 has already been formed in a desired state in the cylinder 8 and flame generated by ignition by the ignition plug 6 has spread widely, so that the air-fuel mixture is burned in a stable state. Therefore, if gasoline fuel is injected into the cylinder 8 by the post injection p1 during this specific period Δt, the fuel is injected in the cylinder 8 in which the gasoline fuel of the main injections m1, m2 is burning. Consequently, the fuel injected by the post injection p1 is easily ignited, and the injected fuel is unlikely to hamper the combustion of gasoline fuel of the main injections m1, m2. Therefore, the combustion state of gasoline fuel during the catalyst warming-up process can be kept stable. Specifically, as will be seen from FIG. 3, in cases where the post injection is performed during the period from the time 50° before EVO to the time concurrent with EVO, the quantity of unburned HC in the exhaust gas is substantially equal to that during the time in which the warming-up is not being performed, and the quantity of NOx in the exhaust gas is smaller than that during the time in which the warming-up is not being performed. If the post injection is performed after the time EVO, a portion of the gasoline fuel injected by the post injection flows to the exhaust port 3, so that the quantity of unburned HC in the exhaust gas tends to increase. Therefore, in the catalyst warming-up process, the post injection p1 is performed during the specific period Δt. In other words, the post injection p1 is started and finished during the specific period Δt.

Now, how to determine the quantity of gasoline fuel injected by the main injections and the quantity of gasoline fuel injected by the post injection will be described. In this specification, the quantity of gasoline fuel injected by the first main injection m1 will be referred to as the first main injection quantity Qm1, the quantity of gasoline fuel injected by the second main injection m2 will be referred to as the second main injection quantity Qm2, and the quantity of gasoline fuel injected by the post injection p1 will be referred to as the post injection quantity Qp1. Moreover, the total quantity of gasoline fuel injected by the main injections and the post injection will be referred to as the total injection quantity Qsum. In the catalyst warming-up process, the air-fuel ratio of the exhaust gas flowing into the three-way catalyst 11 is controlled to a slightly rich air-fuel ratio (e.g. approximately 14.3). Before the catalyst warming-up process is started, the three-way catalyst 11 has been exposed to a lean atmosphere for a relatively long time, and therefore a relatively large quantity of oxygen is stored in the three-way catalyst 11, which has an oxygen storage capability. Therefore, as the catalyst temperature is raised by the catalyst warming-up process and the tree-way catalyst 11 becomes active gradually, the oxygen stored therein is discharged, so that the atmosphere in the exhaust gas purification catalyst tends to be lean. In this case, even if the three-way catalyst 11 is partially made active, it is difficult for the three-way catalyst 11 to exercise its exhaust gas purification capability sufficiently. Hence, in the catalyst warming-up process in some embodiments, the air-fuel ratio of the exhaust gas is made slightly rich in order to facilitate quick discharge of the stored oxygen.

Figure 4:
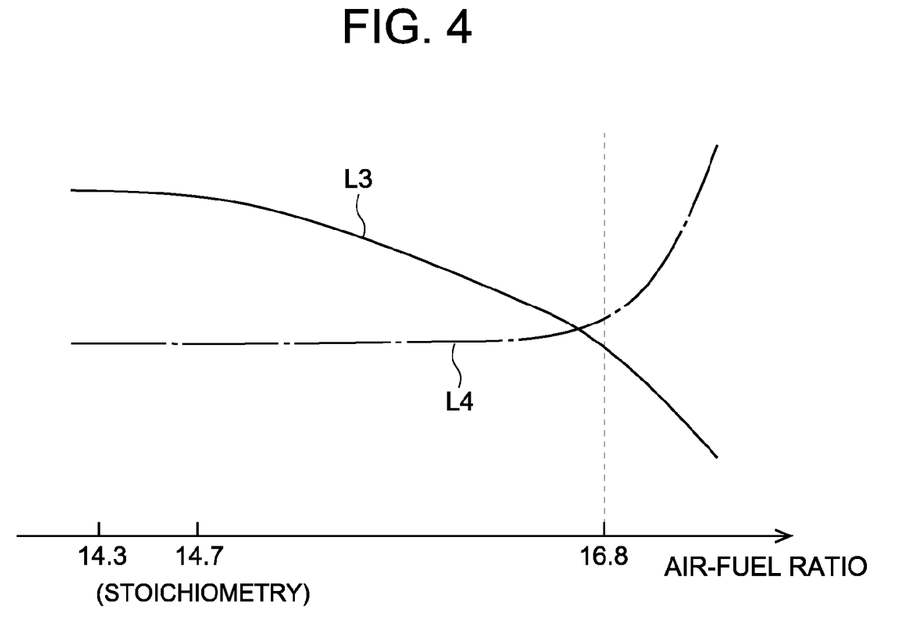
FIG. 4 is a graph showing how the quantity of NOx in the exhaust gas and the output torque difference change as the air-fuel ratio of the air-fuel mixture formed in the cylinder by the main injection is changed in the catalyst warming-up process performed by the control apparatus according to the embodiment.

Therefore, the quantity of gasoline fuel corresponding to a required torque of the gasoline engine 1 during the catalyst warming-up process is calculated as a total injection quantity Qsum. The total injection quantity Qsum of gasoline fuel is injected in a divided manner as the gasoline fuel of the main injections m1, m2 and the gasoline fuel of the post injection p1. This division of the total injection quantity Qsum of gasoline fuel will be described with reference to FIG. 4. When the total injection quantity is fixed at a value Qsum, increasing the post injection quantity Qp1 necessitates decreasing the quantity of gasoline fuel in the main injections m1, m2, as a matter of course. Thus, as the post injection quantity Qp1 is increased, the air-fuel ratio of the air-fuel mixture formed by the gasoline fuel of the main injections m1, m2 (more specifically, the air-fuel mixture formed by the intake air taken into the cylinder 8 and the gasoline fuel injected by the main injections m1, m2, which will be simply referred to as the "main air-fuel mixture" hereinafter) shifts to leaner air-fuel ratios. FIG. 4 shows the change in the quantity of NOx in the exhaust gas (represented by line L3) and the change in the difference between the actual output torque and the required torque of the gasoline engine 1 (represented by line L4) with shifts of the air-fuel ratio of the main air-fuel mixture to leaner air-fuel ratios resulting from increases in the post injection quantity Qp1. The aforementioned difference between the actual output torque and the required torque will be hereinafter referred to as the "output torque difference".

As shown by line L3 in FIG. 4, as the air-fuel ratio of the main air-fuel mixture becomes leaner, the quantity of NOx in the exhaust gas decreases. This is because leaner main air-fuel mixtures lead to lower combustion temperatures, leading to decreases in the quantity of NOx produced. As shown by line L4 in FIG. 4, while in the range of the air-fuel ratio of the main air-fuel mixture near the stoichiometry the output torque difference is nearly constant, in the leaner air-fuel ratio range the output torque difference increases gradually. This is because as the air-fuel ratio of the main air-fuel mixture becomes leaner, the combustion energy generated by the combustion of gasoline fuel injected by the main injections decreases and the quantity of gasoline fuel injected by the post injection increases to make it difficult for the combustion of the injected fuel to contribute to the output torque of the gasoline engine efficiently. Large output torque differences mean that the gasoline engine 1 cannot achieve the required torque during the catalyst warming-up process. Therefore, an allowable range for the output torque difference (which corresponds to the specific allowable range according to embodiments of the present disclosure) is set so that the gasoline engine 1 can achieve the required torque. For example, this allowable range may be a range in which the output torque difference can be considered to be substantially equal to that at the stoichiometry. Therefore, in the case shown in FIG. 4, considering the output torque difference, the air-fuel ratio of the main air-fuel mixture is allowed to be as lean as 16.8.

As above, in view of the fact that the leaner the air-fuel ratio of the main air-fuel mixture is, the smaller the quantity of NOx in the exhaust gas is, the quantity of the gasoline fuel injected by the main injections m1, m2 and the quantity of gasoline fuel Qp1 injected by the post injection p1 are determined in such a way that the main air-fuel mixture has an air-fuel ratio of 16.8. As described above, since the first main injection m1 is performed to facilitate ignition of gasoline fuel of the main injections, the first main injection quantity Qm1 is set to a generally fixed value. The second main injection quantity Qm2 is determined by subtracting the first main injection quantity Qm1 from the sum total of the fuel of the main injection that makes the air-fuel ratio of the main air-fuel mixture equal to 16.8. By determining the injection quantities in the above-described way, the output torque difference can be kept within the allowable range while reducing the quantity of NOx produced by the combustion of gasoline fuel during the catalyst warming-up process. A specific way of determining the quantity of gasoline fuel injected by the main injections m1, m2 and the quantity of gasoline fuel Qp1 injected by the post injection will be described later with reference to FIG. 5.

The graph in the bottom of FIG. 2 shows the change in the air-fuel ratio of the air-fuel mixture in the cylinder in a case where the injection quantities are determined in the above-described manner. With the first main injection m1 and the second main injection m2, an air-fuel mixture having an air-fuel ratio of 16.8 is formed in the cylinder 8, and this air-fuel mixture is ignited by the ignition plug 6 to burn. Thereafter, the post injection p1 is performed, which makes the air-fuel ratio of the air-fuel mixture in the cylinder 8 equal to 14.3. The exhaust gas produced by the combustion of this air-fuel mixture is supplied to the three-way catalyst 11. Thus, through this process, it is possible to reduce the quantity of substances to be removed (namely, unburned HC and NOx) produced by the combustion of gasoline fuel and flowing into the three-way catalyst 11 as much as possible while supplying exhaust gas having a temperature and air-fuel ratio suitable for warming-up of the three-way catalyst 11.

A specific sequence of the catalyst warming-up process for the three-way catalyst 11 in the case where the gasoline engine 1 is cold-started will be described with reference to FIG. 5. This warming-up process is carried out by a control program executed by the ECU 20 and performed repeatedly after the gasoline engine 1 is cold-started until the warming-up of the three-way catalyst 11 is finished. A determination as to whether the gasoline engine 1 is cold-started can be made on the basis of the cooling water temperature or the lubricant temperature at the time of start of the engine. For example, if the cooling water temperature at the time of start of the engine is lower than a predetermined temperature (e.g. 40° C.) or if the temperature of the lubricant of the gasoline engine 1 is lower than a predetermined temperature (e.g. 40° C.), the start of the engine is considered to be cold start. Then, it is considered that the three-way catalyst 11 has been in a cold state, and it is necessary to warm up the three-way catalyst 11.

Figure 5:
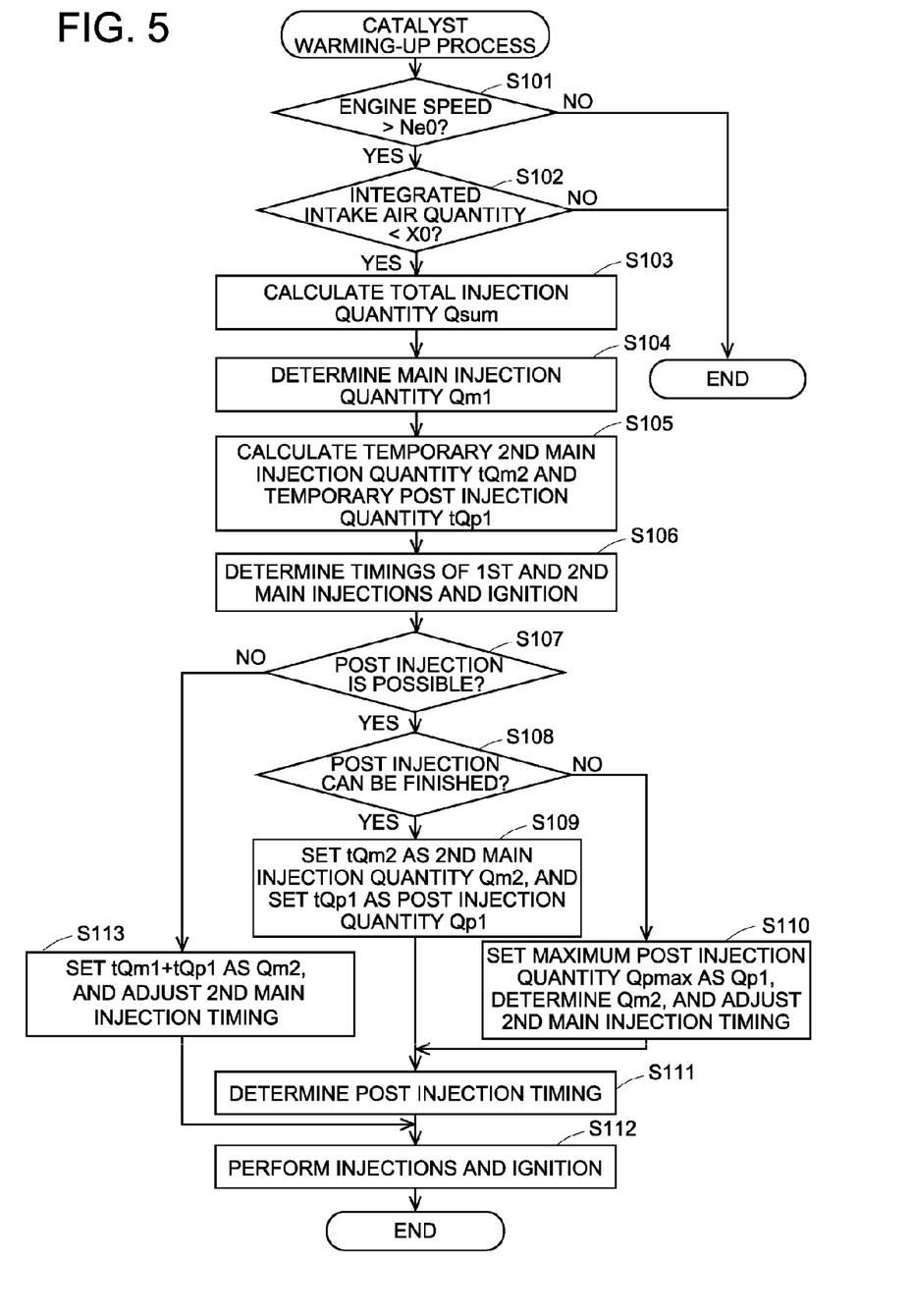
FIG. 5 is a flow chart of the catalyst warming-up control performed in the control by the control apparatus according to the embodiment.

Referring to FIG. 5, firstly in step S101, it is determined whether or not the engine speed of the gasoline engine 1 is higher than a predetermined engine speed Ne0 to make a determination as to the complete explosion state of the gasoline engine 1. If the determination made in step S101 is affirmative, it may be concluded that the gasoline engine 1 is in a complete explosion state. Then, the process proceeds to step S102. On the other hand, if the determination made in step S101 is negative, the catalyst warming-up process is terminated. In step S102, it is determined whether or not the integrated value of the intake air since the start of the catalyst warming-up process is smaller than a predetermined intake air quantity X0. The predetermined intake air quantity X0 is a threshold value of the integrated intake air quantity, which is equal to the total amount of exhaust gas that is needed to warm up the three-way catalyst 11 to an active state in the case where the gasoline engine 1 is cold started. The integrated value of the intake air quantity is calculated by integrating the measurement value of the air flow meter 23 at all times since the start of this catalyst warming-up process by the ECU 20. If the determination made in step S102 is affirmative, the three-way catalyst 11 has not been in an active state yet, and it is necessary to perform the catalyst warming-up process. Then, the processing of step S103 and subsequent steps is performed. On the other hand, if the determination made in step S102 is negative, which means that the three-way catalyst 11 has been made active, the catalyst warming-up process is terminated.

Then, in step S103, the quantity of gasoline fuel in one combustion cycle corresponding to a required torque of the gasoline engine 1 during the catalyst warming-up process is calculated as the total injection quantity Qsum. The above-mentioned quantity of gasoline fuel in one combustion cycle is the sum total quantity of gasoline fuel injected by the first main injection m1, the second main injection m2, and the post injection p1 shown in FIG. 2. Specifically, the quantity of gasoline fuel that is needed to achieve a required torque of the gasoline engine 1 is calculated as the total injection quantity Qsum on the basis of the engine speed, the engine load, and the target air fuel ratio etc. so that high-temperature and slightly-rich exhaust gas (e.g. having an air-fuel ratio of 14.3) can be supplied to the three-way catalyst 11 to warm up the catalyst as described above. After the processing of step S103 is finished, the process proceeds to step S104.

In step S104, the first main injection quantity Qm1 is determined. The first main injection is performed in order to improve the ignitability of the air-fuel mixture formed by gasoline fuel of the main injections. The main injection quantity Qm1 is determined taking account of this. The first main injection quantity Qm1 may be a fixed value. Then, in step S105, a temporary second main injection quantity tQm2 and a temporary post injection quantity tQp1 are calculated. The temporary second main injection quantity tQm2 and the temporary post injection quantity tQp1 are values relating to the quantity of gasoline fuel injected by the second main injection m2 and the quantity of gasoline fuel injected by the post injection p1 respectively. These injection quantities are modified by "temporary" because there is a possibility that their values may be changed by the processing of steps S108 to S110 described later. The air-fuel ratio of the air-fuel mixture formed by the gasoline fuel of the first and the second main injections is to be adjusted to a predetermined lean air-fuel ratio (e.g. an air-fuel ratio of 16.8) in order to make the output torque difference small and to reduce the quantity of NOx as shown in FIG. 4. Therefore, the quantity of gasoline fuel of the main injections that can achieve this predetermined lean air-fuel ratio is calculated, and then the temporary second main injection quantity tQm2 is calculated by subtracting the first main injection quantity Qm1 determined in step S104 from the quantity of gasoline fuel of the main injections calculated as above. Then, the temporary post injection quantity tQp1 is calculated by subtracting the first main injection quantity Qm1 and the temporary second main injection quantity tQm2 from the total injection quantity Qsum calculated in step S103. After the processing of step S105 is finished, the process proceeds to step S106.

In step S106, the time to perform the first main injection m1, the time to perform the second main injection m2, and the time to perform the ignition by the ignition plug 6 needed to warm up the catalyst are determined. The time to perform the first main injection m1 is, for example, a time near the compression top dead center, the time to perform the second main injection m2 is, for example, a time at a middle stage of the intake stroke, and the time to perform the ignition is retarded by correction from that in the case where the catalyst warming-up process is not performed, for example at a time 20° after the compression top dead center. These times to perform the injections and the ignition are determined by accessing a control map stored in a memory of the ECU 20 which specifies the relation between the first main injection quantity Qm1, the temporary second main injection quantity tQm2, the times of injections and the time of ignition. After the process of step S106 is finished, the process proceeds to step S107.

In step S107, it is determined whether or not it is possible to perform the post injection p1 of the temporary post injection quantity tQp1. The post injection p1 is performed by the fuel injection valve 7. Since the fuel injection valve 7 has a specific minimum quantity of gasoline fuel it can inject by one injection, if the temporary post injection quantity tQp1 is smaller than this minimum quantity, it is impossible to perform the post injection p1. Therefore, in step S107, if the temporary post injection quantity tQp1 is equal to or larger than the aforementioned minimum quantity, an affirmative determination is made. Then, the process proceeds to step S108. On the other hand, if the temporary post injection quantity tQp1 is smaller than the aforementioned minimum quantity, a negative determination is made in step S107. Then, the process proceeds to step S113.

In step S108, it is determined whether or not it is possible to finish the injection of gasoline fuel by the temporary post injection quantity tQp1 within a specific period Δt, which is the period from the time t0 at which the in-cylinder pressure starts to increase in the expansion stroke due to the retard of the ignition time by correction to the time EVO at which the exhaust valve 5 is opened. Specifically, the time needed to finish the injection of the temporary post injection quantity tQp1 of gasoline fuel is calculated on the basis of the injection pressure of the fuel injection valve 7 (i.e. the supply pressure of gasoline fuel), and whether or not it is possible to finish the injection is determined by comparing the time thus calculated with the aforementioned specific period Δt. The time t0 is recorded in a control map in the ECU 20 as a variable value that varies depending on the ignition timing and the main injection quantity. The timing t0 is retrieved by accessing the this control map, and the specific period Δt can be calculated by taking account of the time EVO. If the determination made in step S108 is affirmative, the process proceeds to step S109, and if negative, the process proceeds to step S110.

In step S109, since it has been determined that it is possible to finish the injection of the temporary post injection quantity tQp1 of gasoline fuel within the specific period Δt, the temporary second main injection quantity tQm2 is set as the second main injection quantity Qm2, and the temporary post injection quantity tQp1 is set as the post injection quantity Qp1. Thus, the final injection quantities in the respective injections are determined. In step S110, since it has been determined that it is not possible to finish the injection of the temporary post injection quantity tQp1 of gasoline fuel within the specific period Δt, the post injection quantity Qp1 is set to a maximum post injection quantity Qpmax, which is the largest quantity of gasoline fuel that can be injected in the specific period Δt. Then, the second main injection quantity Qm2 is determined by adding the excess of the temporary post injection quantity tQp1 over the maximum post injection quantity to the temporary second main injection quantity tQm2. Thus, the final injection quantities in the respective injections are determined. As described above, the first main injection m1 is performed in order to facilitate ignition of the gasoline fuel of the main injections, and the injection quantity of the first main injection m1 is a substantially fixed value. Therefore, the excess of the temporary post injection quantity Qp1 over the maximum post injection quantity is added to the second main injection quantity among the two injections constituting the main injection to determine the final second main injection quantity Qm2. As above, in cases where the second main injection quantity Qm2 is increased from the temporary second main injection quantity tQm2, the time to perform the second main injection determined in step S106 is adjusted, if necessary.

After the process of step S109 or S110 is finished, the process proceeds to step S111. In step S111, the time to perform the post injection p1 is determined. For example, the time to perform the post injection p1 is set to the time t0 at which the specific period Δt starts. Then, in step S112, injections of gasoline fuel through the fuel injection valve 7 and ignition by the ignition plug 6 are performed according to the injection quantity of the first main injection m1 (i.e. the first main injection quantity Qm1), the time to perform the first main injection m1, the injection quantity of the second main injection m2 (i.e. the second main injection quantity Qm2) and the time to perform the second main injection m2, the injection quantity of the post injection p1 (i.e. the post injection quantity Qp1), the time to perform the post injection p1, and the time to perform the ignition that have been determined as above.

In the case where the determination made in step S107 is negative, in step S113, the second main injection quantity Qm2 is calculated by adding the temporary post injection quantity tQp1 to the temporary second main injection quantity tQm2 to determine its final injection quantity. In this case, since it has been determined in step S107 that it is not possible to perform the post injection, the value of the post injection quantity Qp1 is not set. In cases where the second main injection quantity Qm2 is increased from the temporary second main injection quantity tQm2, the time to perform the second main injection determined in step S106 is adjusted, if necessary. Then, in step S112, injections of gasoline fuel through the fuel injection valve 7 and ignition by the ignition plug 6 are performed according to the injection quantity of the first main injection m1 (i.e. the first main injection quantity Qm1), the time to perform the first main injection m1, the injection quantity of the second main injection m2 (i.e. the second main injection quantity Qm2) and the time to perform the second main injection m2, and the time to perform the ignition that have been determined as above.

By performing the catalyst warming-up process as described in the foregoing, the air-fuel ratio of the main air-fuel mixture is adjusted to a predetermined lean air-fuel ratio while supplying exhaust gas having a temperature and air-fuel ratio desirable for warming-up of the three-way catalyst 11, and the post injection p1 is finished within the specific period Δt. Thereby, it is possible to reduce the quantity of substances to be removed (such as unburned HC and NOx) produced by the combustion of gasoline fuel and to achieve a combustion state that can keep the output torque difference of the gasoline engine 1 during the catalyst warming-up process small. In cases where it is not possible to finish injection of the temporary post injection quantity tQp1 of gasoline fuel within the specific period Δt, the maximum quantity of gasoline fuel that can be injected during the specific period Δt is injected by the post injection, and the remaining quantity is injected by the main injection. Thus, the maximum post injection is performed while keeping the air-fuel ratio of the main air-fuel mixture as close to the predetermined lean air-fuel ratio as possible. In consequence, the quantity of substances to be removed produced by the combustion of gasoline fuel can be made as small as possible.

Figure 6:
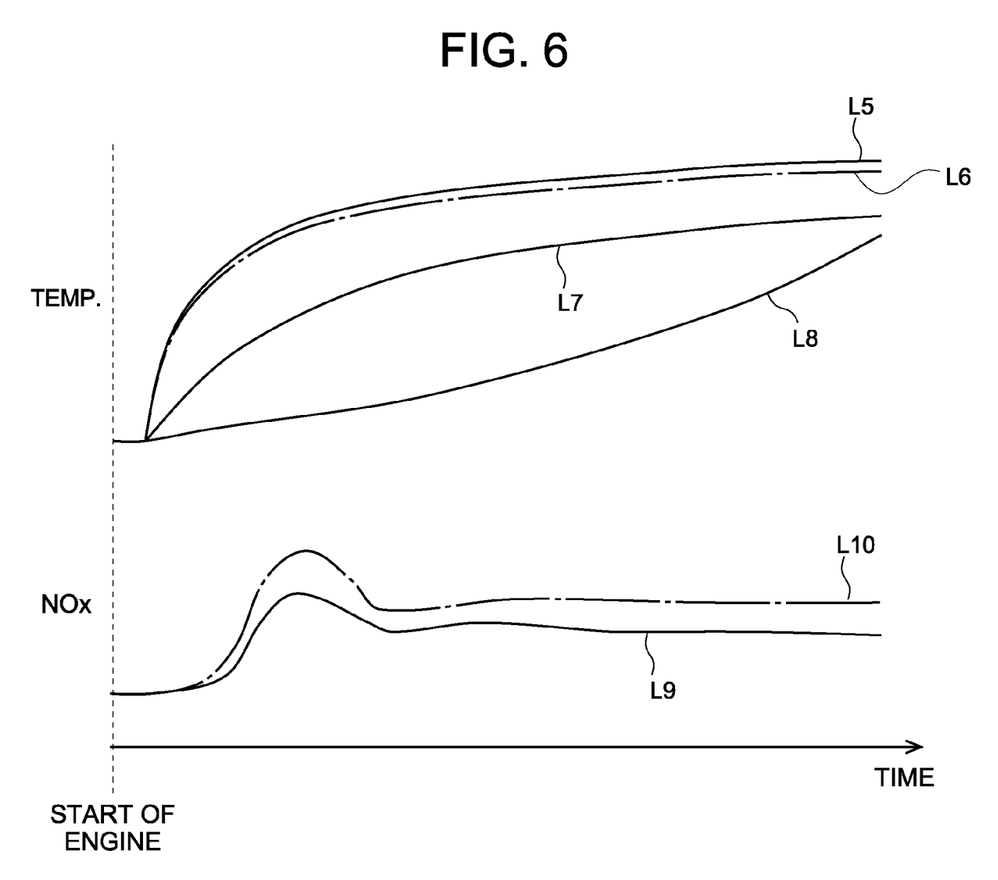
FIG. 6 is a graph showing the changes with time of the exhaust gas temperature, the catalyst temperature, and the NOx concentration in the exhaust gas in a case where the catalyst warming-up control shown in FIG. 5 is performed.

FIG. 6 shows the change with time of the temperature of the exhaust gas just discharged from the cylinder 8 (line L5), the change with time of the exhaust gas immediately before flowing into the three-way catalyst 11 (line L7), the change with time of the temperature of the three-way catalyst 11 (line L8), and the change with time of the NOx concentration in the exhaust gas just discharged from the cylinder 8 in the case where the catalyst warming-up process shown in FIG. 5 (including the processing of step S109, in particular) is performed. The change with time of the temperature of the exhaust gas just discharged from the cylinder 8 represented by the alternate long and short dash line L6 and the change with time of the NOx concentration in the exhaust gas just discharged from the cylinder 8 represented by the alternate long and short dash line L10 are those in a case where a catalyst warming-up process according to a prior art (which will be hereinafter referred to as the prior art catalyst warming-up process) is performed. In this prior art catalyst warming-up process, additional fuel injection is performed at such timing that the additional fuel injection does not contribute to the output torque of the gasoline engine to cause unburned HC in the exhaust gas to burn by after-burning in the exhaust passage to raise the temperature of the exhaust gas. The change with time of the temperature of the exhaust gas immediately before flowing into the three-way catalyst 11 and the change with time of the temperature of the three-way catalyst 11 in the case where the prior art catalyst warming-up process is performed nearly coincide with the changes represented by line L7 and line L8 respectively, and they are not presented separately from lines L7 and L8 in FIG. 6.

As will be understood from the changes with time of the temperatures and the NOx concentration shown in FIG. 6, in the case where the catalyst warming-up process according to FIG. 5 is performed, the temperature of the exhaust gas just discharged from the cylinder 8 is higher than that in the case of the prior art. This is because the gasoline fuel of the post injection is injected in the specific period Δt, and a large part of the total injected fuel including the fuel injected by the main injections is burned in the cylinder 8. Thus, in the catalyst warming-up process according to FIG. 5, the combustion in the cylinder 8 is promoted, leading to a rise in the temperature of the exhaust gas just discharged. This, on the other hand, is counteractive to after-burning of unburned HC in the exhaust passage, which occurs in the case of the prior art, but leads to a reduction of unburned HC of gasoline fuel flowing into the three-way catalyst 11 during the warming-up process.

In the catalyst warming-up process according to FIG. 5, after-burning is unlikely to occur, and a rise in the temperature in the exhaust passage is expected to hardly occur accordingly. However, the temperature of the exhaust gas just discharged from the cylinder 8 is relatively high as will be seen from line L5 in FIG. 5. In consequence, the temperature of the exhaust gas flowing into the three-way catalyst 11 is substantially as high as that in the catalyst warming-up process according to the prior art. Therefore, by the catalyst warming-up process according to FIG. 5, warming-up of the catalyst can be achieved at substantially the same level as in the catalyst warming-up process according to the prior art. As to the NOx concentration, the catalyst warming-up process according to FIG. 5 makes the NOx concentration lower than that with the catalyst warming up process according to the prior art. This is because the combustion temperature of the main air-fuel mixture during the combustion is reduced by adjusting the air-fuel ratio of the main air-fuel mixture to a predetermined lean air-fuel ratio (e.g. 16.8) as described above.

As above, the catalyst warming-up process according to FIG. 5 achieves warming-up of the three-way catalyst 11 at substantially the same level as in the catalyst warming-up process according to the prior art and reduces the quantity of substances to be removed flowing into the three-way catalyst 11 during the warming-up process. Therefore, harmful emissions in the downstream of the three-way catalyst 11 during the catalyst warming-up process can be sufficiently reduced.

In the above-described embodiment, the ECU 20 that executes the catalyst warming-up process corresponds to the controller according to embodiments of the present disclosure.

While in the above-described embodiment the second main injection m2 is performed by the fuel injection valve 7 that can inject fuel directly into the cylinder 8, the second main injection m2 may be performed by a port injection valve that can inject fuel into the intake port 2 alternatively. Even in the case where the second main injection m2 is performed by the port injection valve, the first main injection m1 is performed by the fuel injection valve 7. While in the above-described embodiment the first main injection m1 is performed, the first main injection m1 is not necessarily required to be performed, if the air-fuel mixture formed by the gasoline fuel of the second main injection m2 can be ignited by the ignition plug 6. In the case where the first main injection m1 is not performed, the second main injection quantity Qm2 is determined such that the air-fuel ratio of the air-fuel mixture formed by the gasoline fuel injected by the second main injection m2 has the aforementioned lean air-fuel ratio.

The above-described method of calculating the first main injection quantity Qm1, the second main injection quantity Qm2, and the post injection quantity Qp1 according to the embodiment may be replaced by another calculation method. For example, a control map that specifies relationship between the operation state of the gasoline engine 1 (such as the required torque and the engine speed) during the catalyst warming-up process and the injection quantities may be stored in the ECU 20, and the injection quantities needed in the catalyst warming-up process may be calculated by accessing this control map using the operation state as an argument. The relationship specified by this control map is prepared taking into consideration the formation of the aforementioned combustion state in the cylinder 8 during the catalyst warming-up process, namely the formation of an air-fuel mixture having an air-fuel ratio that enables a reduction in harmful emissions and a reduction of the output torque difference.

What is claimed is:

1. A control apparatus for a gasoline engine, the gasoline engine having a fuel injection means including at least an in-cylinder injection valve for injecting gasoline fuel directly into a cylinder, and an exhaust passage provided with an exhaust gas purification catalyst for purifying exhaust gas discharged from the gasoline engine, the control apparatus comprising:

a controller, comprising at least one processor, configured to, when warming up the exhaust gas purification catalyst, execute a catalyst warming-up process of controlling the fuel injection means to conduct one or more main injections of gasoline fuel, controlling the in-cylinder injection valve to conduct a post injection of gasoline fuel, and performing a retard correction of an ignition timing by an ignition plug at which fuel injected by the one or more main injections is ignited, wherein the controller is further configured to, when executing the catalyst warming-up process:

control the in-cylinder injection valve to conduct the post injection during a specific period, in an expansion stroke until a valve opening time at which an exhaust valve of the gasoline engine is opened, during which pressure in the cylinder increases due to combustion of the gasoline fuel injected by the one or more main injections and ignited by the ignition plug; and determine a quantity of gasoline fuel to be injected by the one or more main injections and a quantity of gasoline fuel to be injected by the post injection such that a total quantity of gasoline fuel to be injected by the one or more main injections and the post injection is a value according to a required torque of the gasoline engine and such that an air-fuel mixture formed in the cylinder by the gasoline fuel injected by the one or more main injections has a predetermined lean air-fuel ratio at which a difference between an actual output torque and the required torque is within a predetermined allowable range.

2. The control apparatus for a gasoline engine according to claim 1, wherein the controller is further configured to, when executing the catalyst warming-up process:

calculate a total injection quantity of gasoline fuel to be injected by the one or more main injections and the post injection based on the required torque;

calculate a temporary main injection quantity defined as a quantity of gasoline fuel capable of achieving the predetermined lean air-fuel ratio;

calculate a temporary main injection quantity of gasoline fuel by subtracting the temporary main injection quantity from the total injection quantity;

determine whether or not it is possible to inject the temporary post injection quantity of gasoline fuel within the specific period;

when determining that it is possible to inject the temporary post injection quantity of gasoline fuel within the specific period, determine the temporary main injection quantity as the quantity of gasoline fuel to be injected by the one or more main injections and determine the temporary post injection quantity as the quantity of gasoline fuel to be injected by the post injection; and when determining that it is not possible to inject the temporary post injection quantity of gasoline fuel within the specific period, determine a maximum post injection quantity, which is the largest quantity of gasoline fuel that can be injected within the specific period by the in-cylinder injection valve, determine a sum of the temporary main injection quantity and an excess of the temporary post injection quantity over the maximum post injection as the quantity of gasoline fuel to be injected by the one or more main injections.

* * * * *